(No Model.)

J. OPPERMAN.
MEANS FOR DETERMINING THE PRESENCE AND INTENSITY OF ATMOSPHERIC ELECTRICITY.

No. 506,066. Patented Oct. 3, 1893.

Witnesses
F. R. Cornwall
A. Ramel

Inventor
Jesse Opperman
By Paul Bakewell
Atty.

UNITED STATES PATENT OFFICE.

JESSE OPPERMAN, OF ST. LOUIS, MISSOURI.

MEANS FOR DETERMINING THE PRESENCE AND INTENSITY OF ATMOSPHERIC ELECTRICITY.

SPECIFICATION forming part of Letters Patent No. 506,066, dated October 3, 1893.

Application filed February 15, 1893. Serial No. 462,384. (No model.)

*To all whom it may concern:*

Be it known that I, JESSE OPPERMAN, a citizen of the United States, residing in the city of St. Louis and State of Missouri, have invented certain new and useful Means for Determining the Presence and Intensity of Atmospheric Electricity, of which the following is a full, clear, and exact description, which will enable those skilled in the art to which it appertains to practice the same.

It is well known that the presence, and the constantly varying intensity, of atmospheric electricity bears a very intimate relation to the various meteorological conditions to which the atmosphere and our earth are subjected, and that these variable electrical conditions exercise a powerful influence upon all animal and vegetable life. Other meteorological conditions, such as the hygrometric, the barometric the thermometric, &c., are constantly noted and careful records of the changes in the same taken, and such records made use of not only to immediate advantage but, also, to predict future conditions.

The object of my invention is to render possible a corresponding knowledge, and to furnish a similar record, of the electrical conditions of the atmosphere, furnishing data relating thereto which can be made use of in a similar, and, perhaps, a more extended and more useful manner.

It consists, briefly stated, in establishing an electrode—a collector or accumulator—at some relatively elevated position; connecting therewith a suitable insulated electrical conductor, which furnishes an efficient pathway for the electrical charge, as collected at the electrode, therefrom to the earth; and in interposing in the length of the said conductor, at some convenient point, a suitable galvanometer, either indicating or recording, for, at all times, measuring the current flowing therethrough.

The accompanying drawings, in which like characters of reference denote like parts where they occur, are a representation of an apparatus, of the character described above, such as I have been using for some time past.

Figure 1:
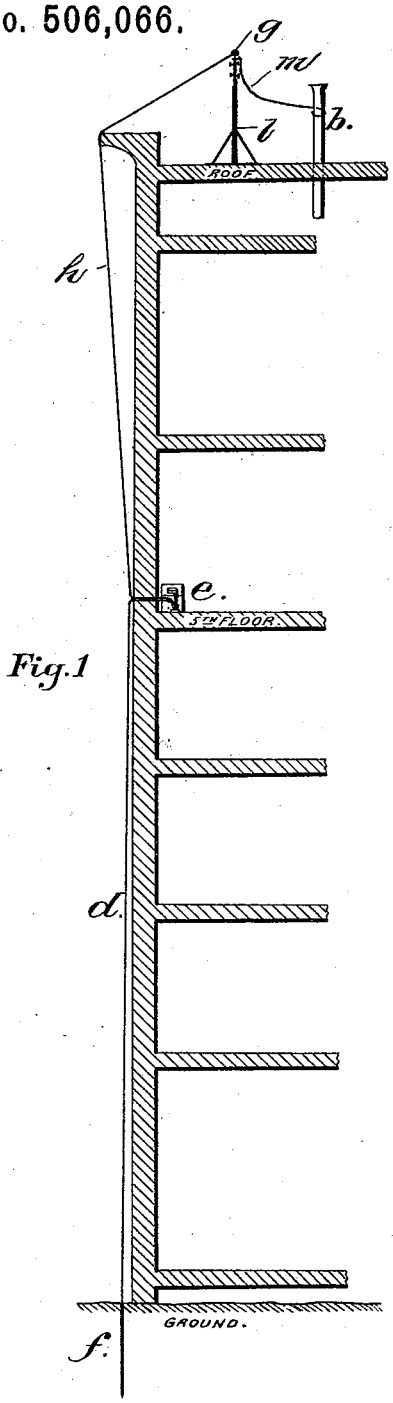
Figure 2:
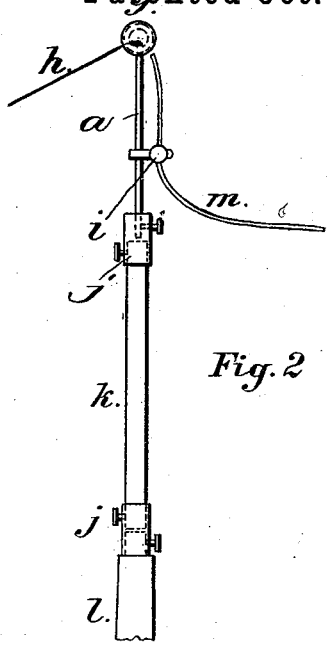
Figure 3:
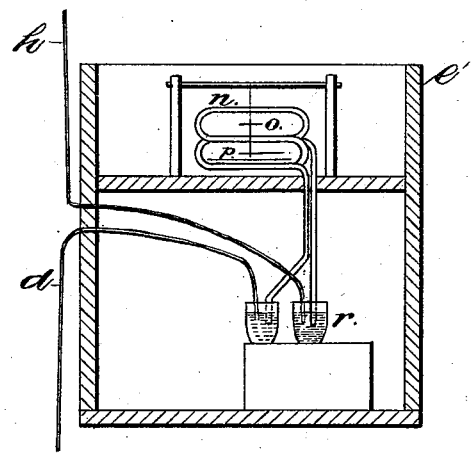

Figure 1 is a sectional elevation of a building, on the roof of which I place my exposed collector. Fig. 2 is an enlarged detail view of the charge-collecting device; and Fig. 3 is an enlarged detail view of the current-measuring device.

$a$ represents an insulated support for the electrode or collector $g$; $h$—$d$ the electric conductor, one terminal of which is connected with the collector $g$ and the other with the ground, as at $f$. In the length of the conductor $h$—$d$ is interposed an electrical measuring device of some desired character, as at $e$.

As shown more in detail in Fig. 2, there is secured a conductor $m$ of large carrying capacity, so that its end is in close proximity to, but not connected with, the collector $g$, which is connected in some manner to the ground, preferably to the stand pipe $b$. It is supported in place, by being secured, by the insulating bracket $i$, to the standard $a$. The object of this arrangement is to provide a safe-guard against an overcharge, as might be collected at the electrode $g$ in a thunder storm, from going to ground through the conductors $h$ and $d$ and through the instrument at $e$, the terminal of the wire $m$ being close enough to the collector $g$ to take off any excess of current, offering as it does a pathway of much less resistance than the conductor $h$—$d$.

As shown in Fig. 2, the collector $g$, which may be of any convenient form, as a ball or plate, is secured on the end of the standard $a$, which, in turn, is supported on the end of the rod $k$ of some insulating material, and this rod $k$ is secured to and supported by the post $l$ which is secured to the roof of the building. The function of this arrangement is, essentially, to insulate the collector $g$ from the building, so that any charge collected by the same can have no other pathway to ground except through the conductor $h$—$d$. When the collector is charged, or, indeed, when there exists any difference of potential at the collector $g$ and the ground at $f$, there will be a current flowing therefrom through the conductor $h$, to the measuring instrument at $e$, through the same, and to ground at $f$, through the conductor $d$. It is obvious that the conductor $h$—$d$ should be efficiently insulated from the building.

The details of the connections shown in Fig. 3, and of the measuring instrument, can, of course, be modified, as may be required or convenient.

As shown, the measuring device consists in a duplex-coil a static needle galvanometer, terminals of which are led to two cups of the mercury, to which are also led, respectively, the terminals of the conductors $h$ and $d$ thereby completing the circuit of the conductors $h$ and $d$ through the coils $n$ of the measuring instrument. In this manner any difference of potential between the static charge of the collector $g$ and the ground at $f$ will be indicated by a current influencing the index needles $o$ and $p$, and the intensity thereof be measured by the deflection-angle of the same.

By a series of experiments carried on by myself, I have found that there is constantly a flow of current through the conductor of varying intensity, and that the varying intensity bears a comparable relation to the changes noted in the temperature, barometric height and hygrometric conditions of the atmosphere, and that changes take place in these current indications that are remarkably coincident with observed sun spots and auroras.

While the angular deflections of the galvanometer needles have generally indicated a direction of flow from air to earth, i. e. a potential at the collector $g$ higher than the normal at the earth at $f$, yet this is by no means invariably so, the opposite having been observed frequently. This in itself, to my mind, proves, beyond a doubt, that the generally accepted theory that the potential of the earth can, for all practical purposes, be considered as zero, or at least comparatively so, is a fallacious one. And, when a series of observations, such as I have been taking, the method of which forms the fundamental subject-matter of this application, as herewith described, can be taken to extend over a sufficiently long period of time, enabling a more critical comparison to be drawn between the current changes thereby indicated and concurrent and coincident phenomena of other characters, there is no question but that data will be furnished from which results may be obtained that will prove themselves eminently useful in the economy of animal and vegetable life on our earth, as well as materially adding to our knowledge of the essential laws of nature.

While I am aware that I advance nothing new in the statement that the atmosphere is more or less highly charged with electricity, and that its presence has been observed and that magnetometers have been used to detect the strength of the earth's magnetic field, &c., yet, as far as I know, no adequate means, such as herein described, has been devised or used to constantly note and record the ever varying differences of electrical potential between the atmosphere and the earth and furnish data for determining the positive relations therebetween.

Having thus described my invention and in what manner the same should be practiced, what I claim, and desire to secure by Letters Patent, is—

The herein-described means for detecting and measuring atmospheric electricity, consisting in the combination with a collector situated at a relatively elevated position, of an insulated conductor, connected at one end with the collector and grounded at the other end, and a measuring instrument interposed in the length of the conductor, substantially as and for the purposes specified.

In testimony whereof I hereunto affix my signature, in presence of two witnesses, this 3d day of February, 1893.

JESSE OPPERMAN.

Witnesses:
A. RAMEL,
H. K. WAGNER.